(12) United States Patent
Gurevich et al.

(10) Patent No.: US 7,743,989 B2
(45) Date of Patent: Jun. 29, 2010

(54) LASER POWER CONTROL ARRANGEMENTS IN ELECTRO-OPTICAL READERS

(75) Inventors: Vladimir Gurevich, Stony Brook, NY (US); Heng (Jade) Zhang, Holbrook, NY (US); David Tsi Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 550 days.

(21) Appl. No.: 11/528,909

(22) Filed: Sep. 28, 2006

(65) Prior Publication Data

US 2008/0078835 A1 Apr. 3, 2008

(51) Int. Cl.
*G06K 7/10* (2006.01)
(52) U.S. Cl. .............. 235/455; 372/38.01; 372/38.07; 369/53.26
(58) Field of Classification Search ............ 235/455
See application file for complete search history.

(56) References Cited

U.S. PATENT DOCUMENTS

| | | | | |
|---|---|---|---|---|
| 4,575,625 A | * | 3/1986 | Knowles | 235/462.3 |
| 6,038,203 A | * | 3/2000 | Tajiri et al. | 369/112.1 |
| 7,428,995 B1 | * | 9/2008 | Stern et al. | 235/462.01 |
| 2002/0075917 A1 | * | 6/2002 | Suda | 372/38.01 |
| 2006/0016891 A1 | | 1/2006 | Giebel et al. | |
| 2006/0198405 A1 | * | 9/2006 | Guenter et al. | 372/29.021 |

FOREIGN PATENT DOCUMENTS

WO 2008039963 4/2008

OTHER PUBLICATIONS

International Preliminary Report on Patentability Report dated Apr. 9, 2009 related case PCT/US2007/079815.

* cited by examiner

*Primary Examiner*—Seung H Lee
*Assistant Examiner*—Tae Kim

(57) ABSTRACT

Laser power control arrangements interrupt power to a laser used in electro-optical readers upon detection of operating conditions not conforming to preestablished standards, and adjust power to the laser to enhance reader performance without violating prevalent safety standards. Dual monitors are used to independently monitor the output power of the laser.

11 Claims, 4 Drawing Sheets

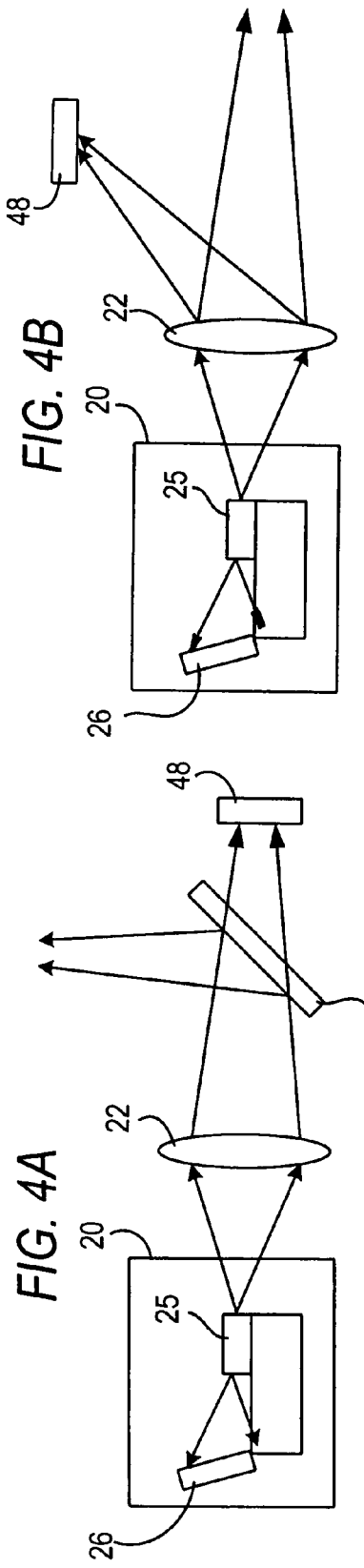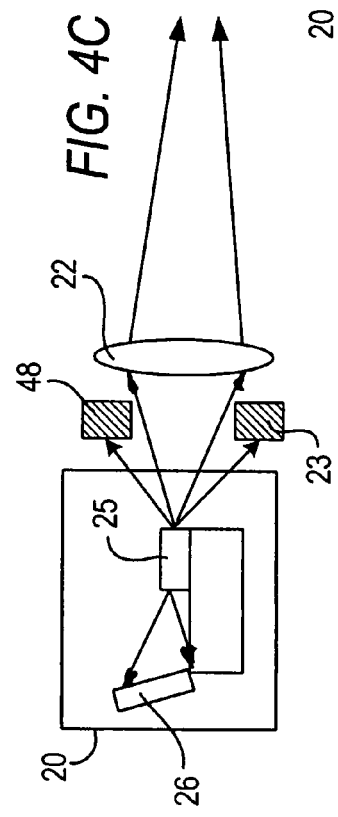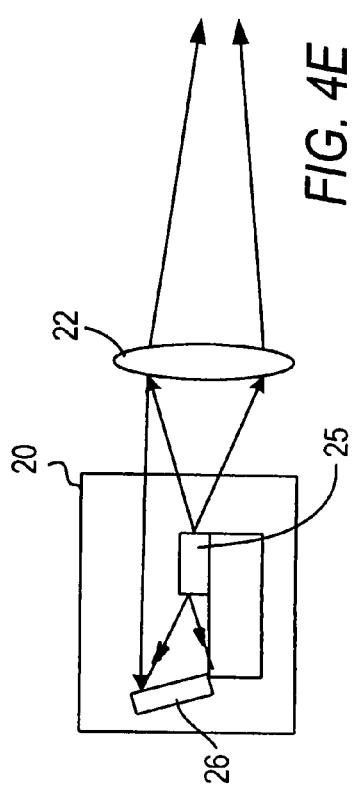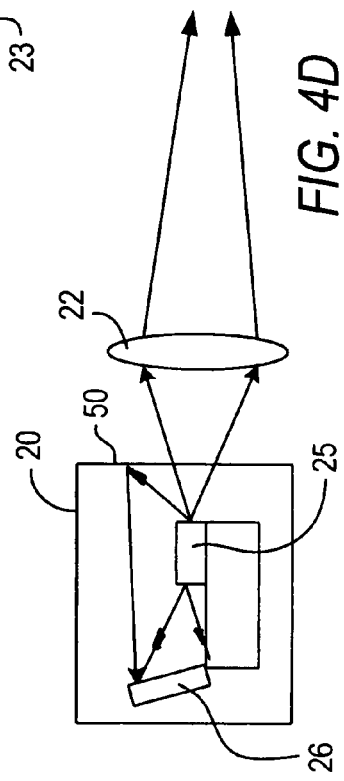

LASER POWER CONTROL ARRANGEMENTS IN ELECTRO-OPTICAL READERS

BACKGROUND OF THE INVENTION

Various electro-optical systems or readers have been developed for reading indicia such as bar code symbols appearing on a label or on a surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the pattern of the graphic indicia into a time-varying electrical signal, which is digitized and decoded into data relating to the symbol being read.

Typically, a laser beam from a laser is directed along a light path toward a target that includes the bar code symbol on a target surface. A moving-beam scanner operates by repetitively sweeping the laser beam in a scan line or a series of scan lines across the symbol by means of motion of a scanning component, such as the laser itself or a scan mirror disposed in the path of the laser beam. Optics focus the laser beam into a beam spot on the target surface, and the motion of the scanning component sweeps the beam spot across the symbol to trace a scan line across the symbol. Motion of the scanning component is typically effected by an electrical drive motor.

The readers also include a sensor or photodetector which detects light along the scan line that is reflected or scattered from the symbol. The photodetector or sensor is positioned such that it has a field of view which ensures the capture of the reflected or scattered light, and converts the latter into an electrical analog signal.

In retroreflective light collection, a single optical component, e.g., a reciprocally oscillatory mirror, such as described in U.S. Pat. No. 4,816,661 or U.S. Pat. No. 4,409,470, both herein incorporated by reference, sweeps the beam across the target surface and directs the collected light to the sensor. In non-retroreflective light collection, the reflected laser light is not collected by the same optical component used for scanning. Instead, the sensor is independent of the scanning beam, and has a large field of view so that the reflected laser light traces across the sensor.

Electronic control circuitry and software decode the electrical analog signal from the sensor into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process usually works by applying the digitized signal to a microprocessor running a software algorithm, which attempts to decode the signal. If a symbol is decoded successfully and completely, the decoding terminates, and an indicator of a successful read (such as a green light and/or audible beep) is provided to a user. Otherwise, the microprocessor receives the next scan, and performs another decoding into a binary representation of the data encoded in the symbol, and to the alphanumeric characters so represented. Once a successful read is obtained, the binary data is communicated to a host computer for further processing, for example, information retrieval from a look-up table.

Reading performance is a function of many factors, one of which is power output of the laser. Reading performance is enhanced when the laser power output is increased. Yet, stringent safety standards dictate the maximum power output of the laser. Also, reader malfunction must be reliably monitored.

SUMMARY OF THE INVENTION

One feature of the present invention resides, briefly stated, in laser power control arrangements in electro-optical readers for reading indicia, such as bar code symbols, by generating a laser beam having an output power upon energizing a laser, by monitoring various operating conditions of the reader, and by controlling the output power of the laser beam as a function of each monitored operating condition.

In one arrangement, the electrical current passing through the laser and/or the output power level of the laser is directly monitored and, if preestablished settings are not met, the laser is deenergized. In another arrangement, the laser includes a laser diode, and a monitor photodiode for monitoring the output power of the laser. If preestablished settings for the monitor photodiode are not met, the laser is deenergized. In yet another arrangement, a redundant auxiliary photodiode, independently of the monitor photodiode, is operative for monitoring the output power of the laser.

Whenever the laser is deenergized, this signifies that a reader malfunction has occurred, or may be imminent, in which case, removal of the laser from its source of power discontinues the generation of the laser beam and serves as a safety measure. Whenever the laser power is increased, this boosts reader performance.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 4A-4E are diagrammatic views of details of still more components for additional laser power control arrangements in accordance with the present invention.

DETAILED DESCRIPTION OF THE PREFERRED EMBODIMENTS

Figure 1:
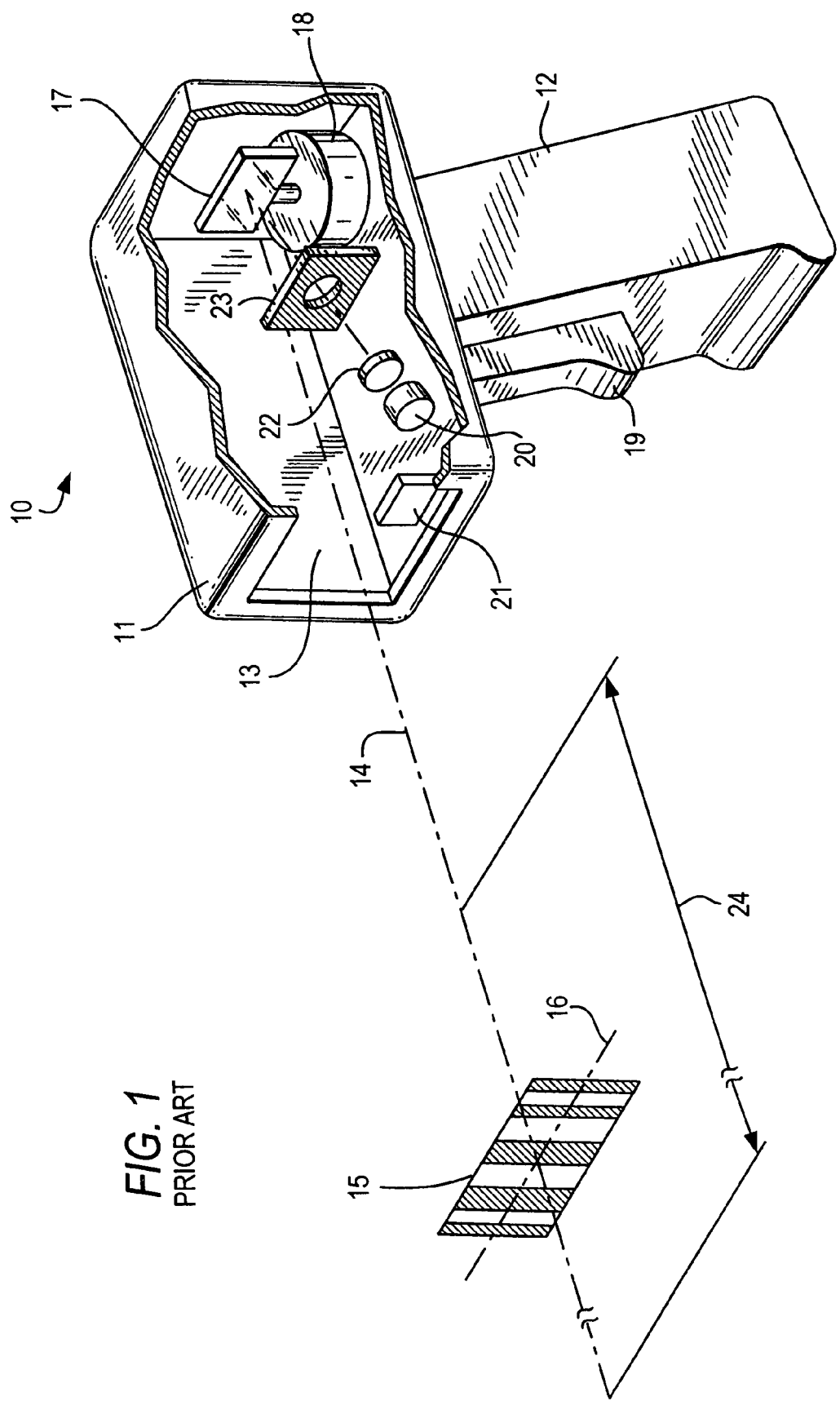
FIG. 1 is a perspective view of an electro-optical reader in accordance with the prior art.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia which may be recognized or identified either by scanning a light beam and detecting reflected or scattered light as a representation of variations in light reflectivity at various points of the pattern or indicia. FIG. 1 shows an indicia 15 as one example of a "symbol" to be read.

FIG. 1 depicts a handheld laser scanner device 10 for reading symbols. The laser scanner device 10 includes a housing having a barrel portion 11 and a handle 12. Although the drawing depicts a handheld pistol-shaped housing, the invention may also be implemented in other types of housings such as a desk-top workstation or a stationary scanner. In the illustrated embodiment, the barrel portion 11 of the housing includes an exit port or window 13 through which an outgoing laser light beam 14 passes to impinge on, and scan across, the bar code symbol 15 located at some distance from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or similar means permit an operator to initiate the scanning operation when the operator holds and aims the device 10 at the symbol 15.

The scanner device 10 includes a laser source 20 mounted within the housing. The laser source 20 generates the laser beam 14. A photodetector 21 is positioned within the housing to collect at least a portion of the light reflected and scattered from the bar code symbol 15. The photodetector 21, as shown, faces toward the window 13 and has a static, wide field of view characteristic of the non-retro-reflective readers described above. Alternatively, in a retro-reflective reader, a convex portion of the scan mirror 17 may focus collected light on the photodetector 21, in which case the photodetector faces toward the scan mirror. As the beam 14 sweeps the symbol 15, the photodetector 21 detects the light reflected and scattered from the symbol 15 and creates an analog electrical signal proportional to the intensity of the collected light.

A digitizer (not shown) typically converts the analog signal into a pulse width modulated digital signal, with the pulse widths and/or spacings corresponding to the physical widths of the bars and spaces of the scanned symbol 15. A decoder (not shown), typically comprising a programmed microprocessor with associated RAM and ROM, decodes the pulse width modulated digital signal according to the specific symbology to derive a binary representation of the data encoded in the symbol, and the alphanumeric characters represented by the symbol.

The laser source 20 directs the laser beam through an optical assembly comprising a focusing lens 22 and an aperture stop 23, to modify and direct the laser beam onto the scan mirror 17. The mirror 17, mounted on a vertical shaft and oscillated by the motor drive 18 about a vertical axis, reflects the beam and directs it through the exit port 13 to the symbol 15.

To operate the scanner device 10, the operator depresses trigger 19 which activates the laser source 20 and the motor 18. The laser source 20 generates the laser beam which passes through the element 22 and aperture 23 combination. The element 22 and aperture 23 modify the beam to create an intense beam spot of a given size which extends continuously and does not vary substantially over a range 24 of working distances. The element and aperture combination directs the beam onto the rotary mirror 17, which directs the modified laser beam outwardly from the scanner housing 11 and toward the bar code symbol 15 in a sweeping pattern, i.e., along scan line 16. The bar code symbol 15, placed at any point within the working distance 24 and substantially normal to the laser beam 14, reflects and scatters a portion of the laser light. The photodetector 21, shown mounted in the scanner housing 11 in a non-retro-reflective position, detects the reflected and scattered light and converts the received light into an analog electrical signal. The photodetector could also be mounted in a retro-reflective position facing the scan mirror 17. The system circuitry then converts the analog signal to a pulse width modulated digital signal which a microprocessor-based decoder decodes according to the characteristics of the bar code symbology rules.

Figure 2:
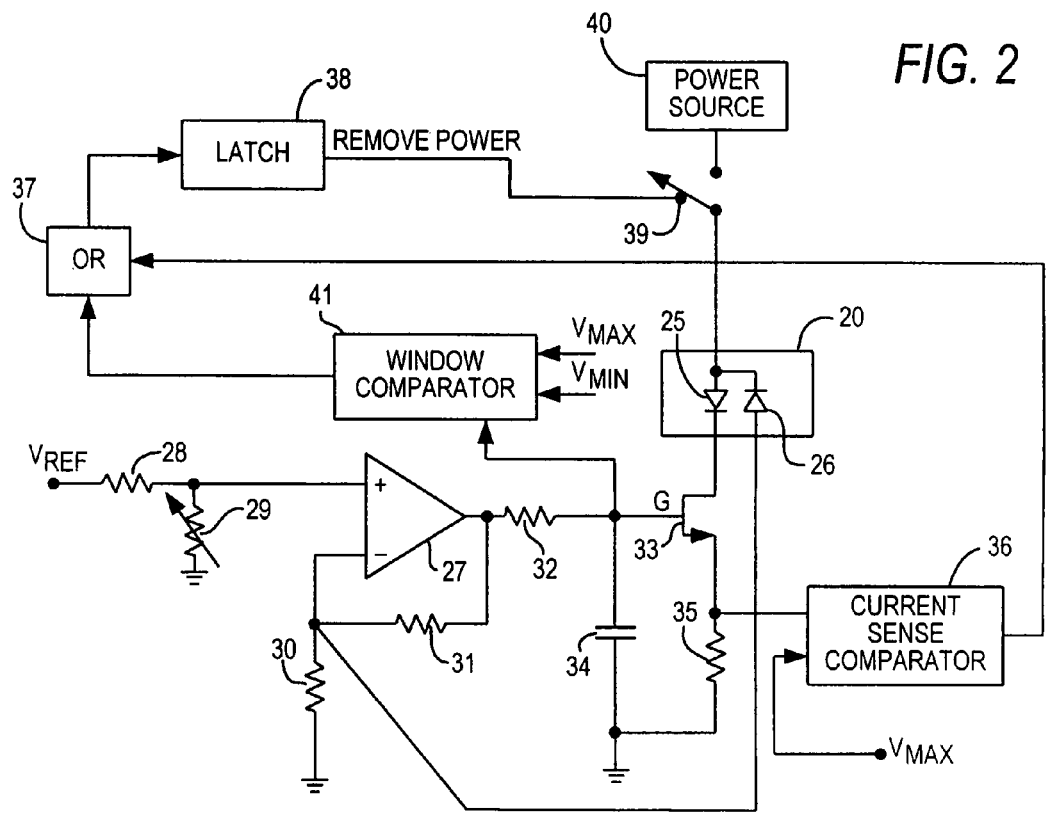
FIG. 2 is a circuit schematic depicting laser power control arrangements in accordance with the present invention especially useful in the reader of FIG. 1.

As shown in FIG. 2, the laser source 20 includes a laser diode 25 and a monitor photodiode 26 operative for monitoring the output power of the diode 25. The monitor photodiode 26 is part of a feedback circuit operative for maintaining the laser output power constant. The feedback circuit includes a comparator 27 having a reference voltage applied to a positive input of the comparator through a voltage divider comprised of resistors 28, 29. The monitor photodiode 26 is connected to a negative input of the comparator via a resistive network including resistors 30, 31. The output of the comparator 27 is conducted through a resistor 32 and capacitor 34 to a gate G of a field effect transistor (FET) 33. The drain output of the FET 33 is connected to the laser diode 25. The source output of the device 33 is connected to ground through a current sense resistor 35.

The circuit of FIG. 2 is conventional in that the monitor photodiode 26 detects changes in output power of the laser beam emitted by laser diode 25 and sends a feedback signal to the comparator 27 for driving the FET 33 to allow more or less current to pass through the current sense resistor 35 and, in turn, through the laser diode 25. The greater this current, the greater the laser output power, and vice versa.

A current sense comparator 36 has one input connected to the current sense resistor 35 to monitor the current flowing therethrough, and another input connected to a reference voltage that corresponds to the maximum current allowable through the resistor 35. The output of the comparator 36 is connected to an OR gate 37 which, in turn, is connected to a latch 38 and a switch 39, which is connected between a power supply 40 and the laser diode 25. If the comparator 36 senses that the current passing through the resistor 35 exceeds a maximum preestablished value, then an output control signal is conducted to the gate 37 and, in turn, to the latch 38 for opening the switch 39 to remove the power source 40 from energizing the laser diode 25.

In further accordance with FIG. 2, a window comparator 41 is connected to the resistor 32 and monitors the voltage being applied to the gate G of the FET 33. A maximum gate voltage and a minimum gate voltage are also applied to the window comparator 41. The comparator 41 is, in turn, connected to the OR gate 37. If the comparator 41 senses that the gate voltage being applied to the gate G is greater than the preestablished maximum gate voltage, or is less than the preestablished minimum gate voltage, then a signal is sent to the OR gate 37 to operate the latch 38 and open the switch 39, thereby deenergizing the laser diode. Thus, power is removed from the laser diode 25 in the event of malfunction or failure of the monitor photodiode 26, the FET 33, the comparator 27, the laser diode 25, or any circuit connection.

More specifically, the FIG. 2 circuit removes the power source 40 from the laser 20 after detecting an out-of-range condition in the error amplifier 27 that controls the output power of the laser. This circuit will remove power from the laser under the following conditions:

A failure of the device 33 in the output of the laser drive causes excess current to flow through the laser, thereby causing the laser output to exceed the factory set limit.

The monitor diode 26 connection is lost due to a device 33 failure or a circuit connection failure.

The laser fails and the laser drive current significantly increases as resistor 35 is used to sense a high current drive condition.

Advantageously, a timer could be added to the FIG. 2 circuit to remove power only when a malfunction persists for a predetermined time.

Figure 3:
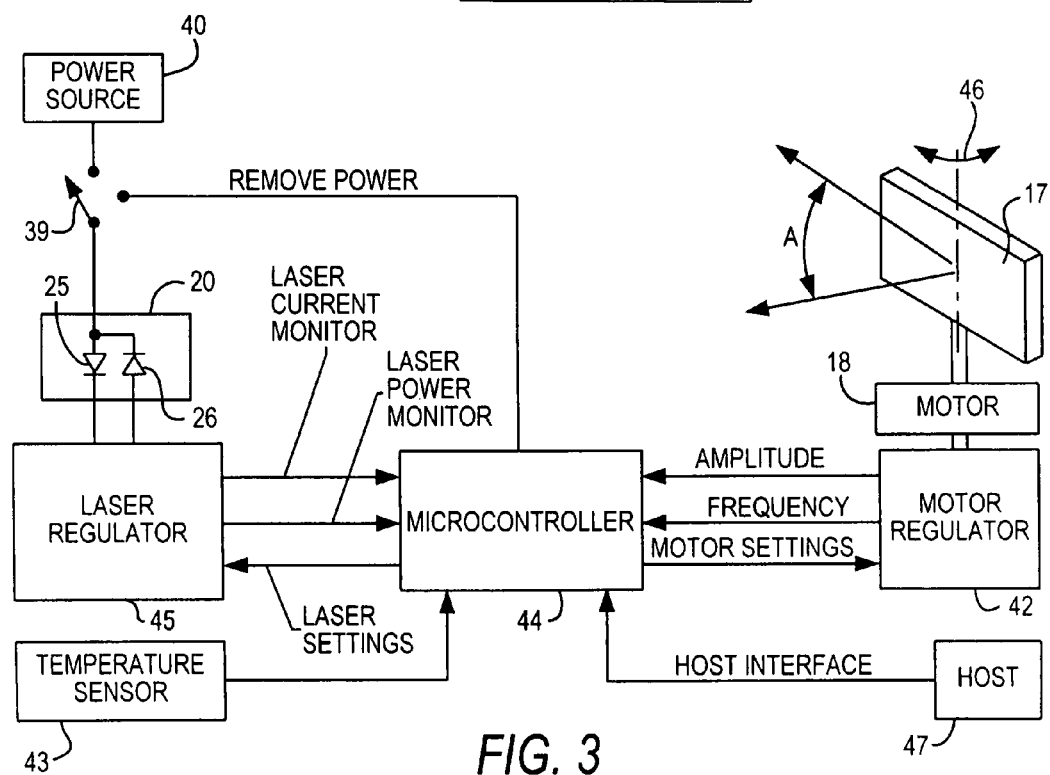
FIG. 3 is a diagrammatic view of additional laser power control arrangements in accordance with the present invention.

As shown in the arrangement of FIG. 3, the laser source 20 is connected to the power source 40 by the switch 39 under control of a microcontroller 44, preferably the same component that decodes the symbol and controls overall reader operation. A temperature sensor 43 is connected to the microcontroller 44 for monitoring the ambient temperature of the reader, preferably in the vicinity of the laser source 20. If the monitored temperature exceeds a preset value, the microcontroller 44 opens the switch 39 to protect the laser source. A laser regulator 45 is connected to the laser source 20 and enables the microcontroller 44 to monitor the laser current and/or the laser output power and, if those values or other laser settings are outside preestablished values for these parameters, then the microcontroller 44 also opens the switch 39 to protect the laser source.

The aforementioned motor 18 for oscillating the scan mirror 17 in alternate circumferential directions denoted by the double-headed arrow 46 is under the control of a motor regulator 42 and the microcontroller 44. The microcontroller itself monitors the amplitude of scan angle A and the frequency of oscillation at which the mirror 17 is oscillated. If these values or other motor settings are outside preestablished values for these parameters, then the microcontroller 44 opens the switch 39. The microcontroller 44 can store the preestablished values, or it can communicate with a remote host 47 to retrieve the preestablished values, or updated values, or communicate to the host the presence of a fault condition, such as a laser or motor fault, or, at the request of the host, communicate operating parameters of the system such as motor frequency, temperature, and/or laser power, or the host can attempt to resolve such problems by initiating and controlling a system calibration episode to correct such faults, i.e., reduce laser power, or increase scan amplitude.

Other arrangements for removing power from the laser source 20 are depicted in FIGS. 4A-E. In each figure, the laser diode 25 emits the laser beam toward the focusing lens 22, and the monitor photodiode 26 is positioned behind a rear facet of the laser diode 25 to monitor the output power level.

In FIG. 4A, an auxiliary photodiode 48 is positioned behind a beam splitter 49 to monitor the outgoing laser beam. In FIG. 4B, a diffractive structure is located on the focusing lens 22 to direct a part of the outgoing beam to the auxiliary photodiode 48. In FIG. 4C, the auxiliary photodiode 48 itself is shaped as an annulus to serve as the aperture stop 23, and the walls bounding the aperture receive the outgoing beam for detection by the auxiliary photodiode. The auxiliary photodiode 48 is redundant to the monitor photodiode 26 and is especially useful when the monitor photodiode 26 fails or loses sensitivity. In FIG. 4D, an auxiliary photodiode is not used, but a light scattering surface 50 is provided inside the laser source to reflect a part of the outgoing beam back to the monitor photodiode 26. In FIG. 4E, again an auxiliary photodiode is not used, but an incident surface of the focusing lens 22 is used to backscatter a part of the outgoing beam back to the monitor photodiode.

Figure 5:
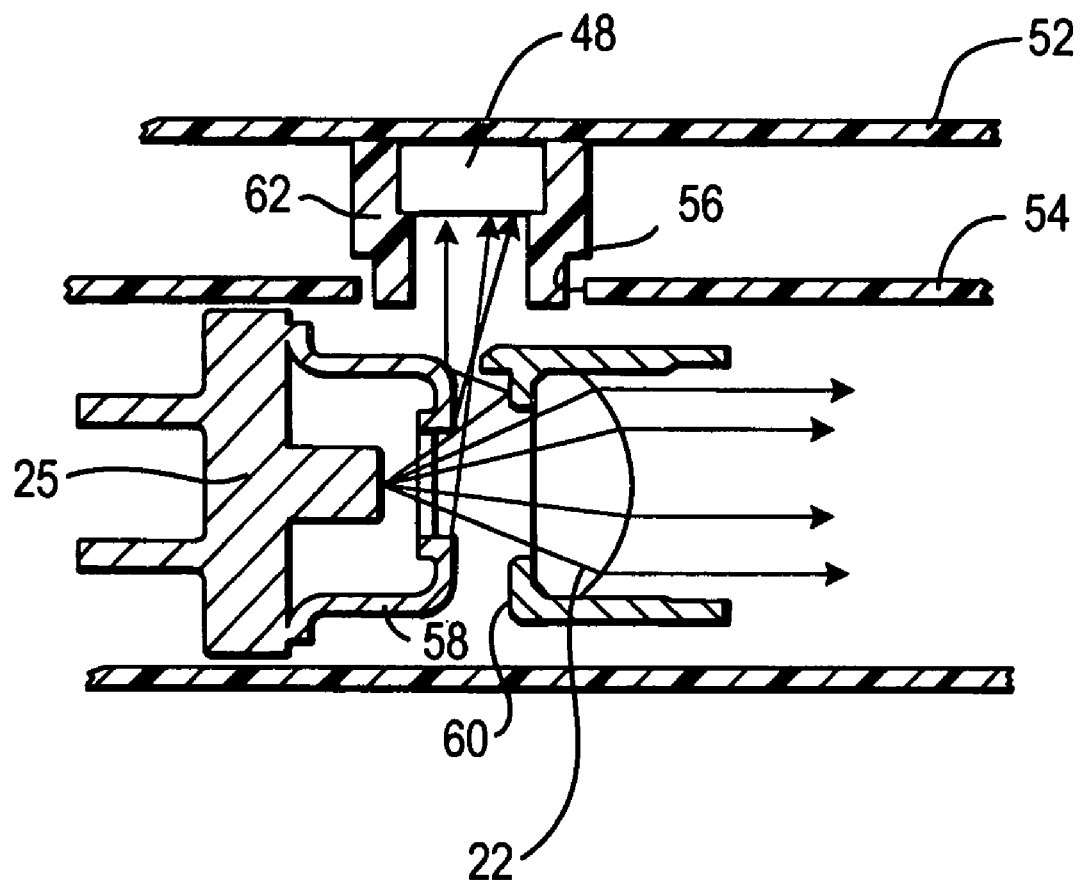
FIG. 5 is a diagrammatic view of yet more components for an additional laser power control arrangement in accordance with the present invention

In FIG. 5, the redundant auxiliary photodiode 48 is surface-mounted on a printed circuit board (PCB) 52 spaced away from a chassis 54 having a hole 56. The laser diode 25 and the focusing lens 22 are mounted on the chassis 54. The monitor photodiode is not shown in FIG. 5. The laser diode 25 emits the laser beam through the focusing lens, and a fraction of the laser beam is reflected by the focusing lens toward a casing 58 that houses the laser diode. The fraction of the laser beam is also reflected from the casing 58, as well as from a holder 60 for the focusing lens 22. A portion of the fraction of the laser beam passes through the hole 56 located in the region between the laser diode and the focusing lens 22 and is detected by the redundant auxiliary photodiode 48 and serves as a measure of the output power of the laser beam. A rubber boot 62 surrounds the redundant auxiliary photodiode 48 and serves as an enclosure to prevent stray ambient light from being detected by the photodiode 48.

In the arrangements of FIGS. 4A-E and FIG. 5, the additional light detected by either the auxiliary photodiode 48, or the monitor photodiode 26, is monitored and converted by the microcontroller 44 to generate a control signal used to open the switch 39 when the monitored operating condition does not meet a preestablished value. This feature promotes safety in the use of a reader in which a laser beam is generated.

It will be understood that each of the elements described above, or two or more together, also may find a useful application in other types of constructions differing from the types described above.

While the invention has been illustrated and described as embodied in laser power control arrangements in electro-optical readers, it is not intended to be limited to the details shown, since various modifications and structural changes may be made without departing in any way from the spirit of the present invention.

Although described in connection with moving-beam readers, the laser control arrangements of this invention can equally well be applied to imaging readers, laser projection displays and, in general, any system in which a light source is used for illumination of, and for aiming at, a target.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A laser power control arrangement in an electro-optical reader for reading indicia, comprising:
    a) a laser for generating a laser beam having an output power, and wherein the laser is a laser diode;
    b) a pair of monitors for independently monitoring an operating condition of the reader, each monitor being operative for independently detecting reader malfunction when the operating condition differs from a preestablished condition, and wherein one of the monitors is a monitor photodiode and the other of the monitors is an auxiliary photodiode;
    c) an enclosure surrounding the auxiliary photodiode to prevent stray light from entering the auxiliary photodiode;
    d) a focusing lens for focusing the laser beam, and wherein the laser diode and the focusing lens are mounted adjacent each other to enable a fraction of the laser beam reflected by the focusing lens to enter a hole on the enclosure surrounding the auxiliary photodiode; and e) a controller for controlling the output power of the laser beam upon detection of the reader malfunction.

2. The arrangement of claim 1, wherein each monitor is operative for monitoring an operating condition of the laser, and wherein the controller is operative for deenergizing the laser when the operating condition of the laser is not a preestablished setting.

3. The arrangement of claim 2, wherein the preestablished setting for the laser is one of a range of laser current levels and a range of laser power levels, and wherein the controller is operative for deenergizing the laser when the operating condition of the laser is outside one of the ranges.

4. The arrangement of claim 1, wherein the laser diode and the focusing lens are mounted adjacent each other on a support.

5. The arrangement of claim 4, further comprising a printed circuit board on which the auxiliary photodiode is mounted at a location juxtaposed with the hole.

6. A laser power control method in an electro-optical reader for reading indicia, comprising the steps of:

a) generating a laser beam having an output power with a laser, and wherein the generating step is performed by a laser diode;

b) independently monitoring an operating condition of the reader with dual monitors, each monitor being operative for independently detecting reader malfunction when the operating condition differs from a preestablished condition, wherein the monitoring step is performed by a monitor photodiode and an auxiliary photodiode, and wherein the monitoring step further comprises reflecting a fraction of a laser beam by a focusing lens to the auxiliary photodiode through a hole on an enclosure surrounding the auxiliary photodiode for preventing stray light from entering the auxiliary photodiode; and c) controlling the output power of the laser beam upon detection of the reader malfunction.

7. The method of claim 6, wherein the monitoring step is performed by monitoring an operating condition of the laser, and wherein the controlling step is performed by deenergizing the laser when the operating condition of the laser is not a preestablished setting.

8. The method of claim 7, wherein the preestablished setting for the laser is one of a range of laser current levels and a range of laser power levels, and wherein the controlling step is performed by deenergizing the laser when the operating condition of the laser is outside one of the ranges.

9. The method of claim 6 and the step of focusing the laser beam with the focusing lens, and the step of mounting the laser diode and the focusing lens adjacent each other on a support.

10. The method of claim 9, and the step of mounting the auxiliary photodiode on a printed circuit board at a location juxtaposed with the hole.

11. The method of claim 10, wherein the step of mounting the auxiliary photodiode is performed by surface mounting the auxiliary photodiode on the printed circuit board.

* * * * *